Nov. 4, 1952 E. J. THURBER 2,616,303
TORQUE CONVERTER
Filed Oct. 6, 1948 3 Sheets-Sheet 1
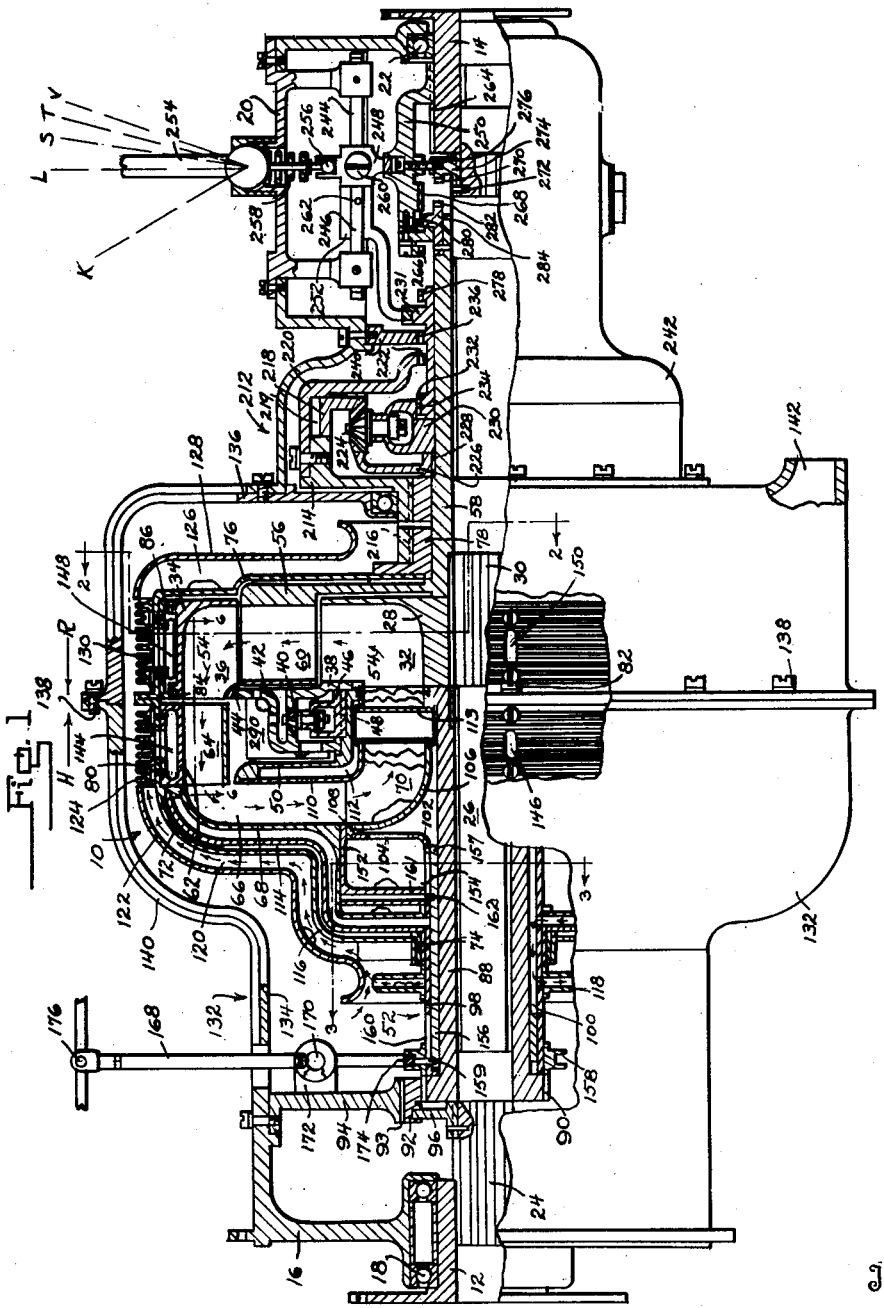
Inventor
Edward J. Thurber
By Serwrier Parker
ATTORNEYS Nov. 4, 1952 — E. J. THURBER — 2,616,303
TORQUE CONVERTER
Filed Oct. 6, 1948 — 3 Sheets-Sheet 2
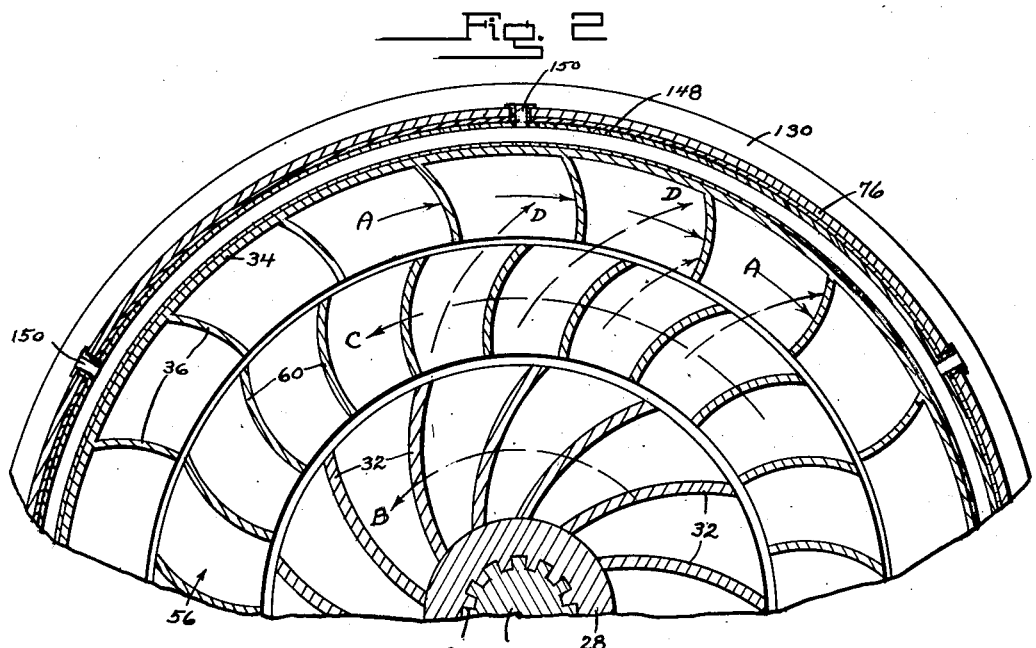
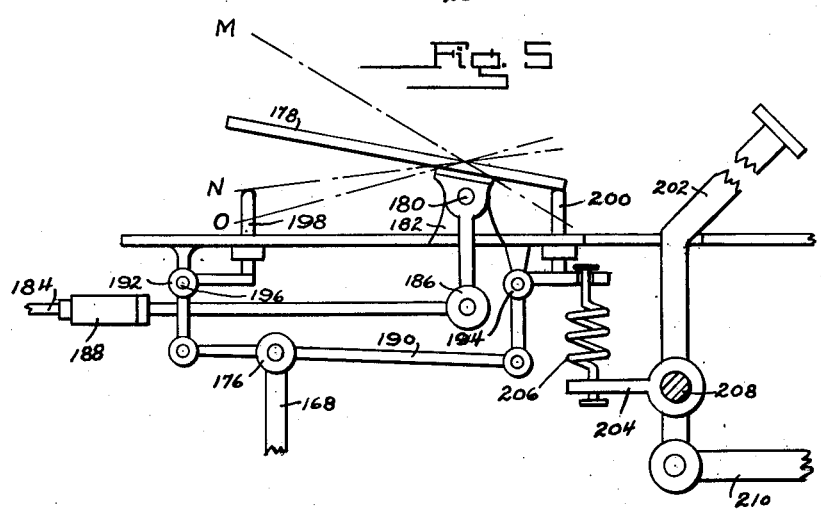
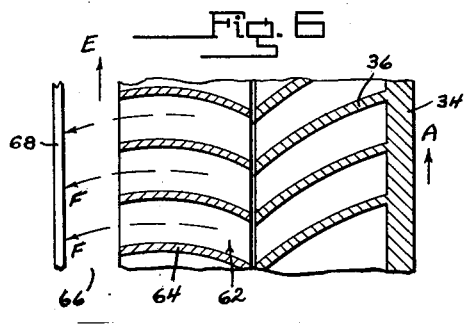
Inventor
Edward J. Thurber
ATTORNEYS

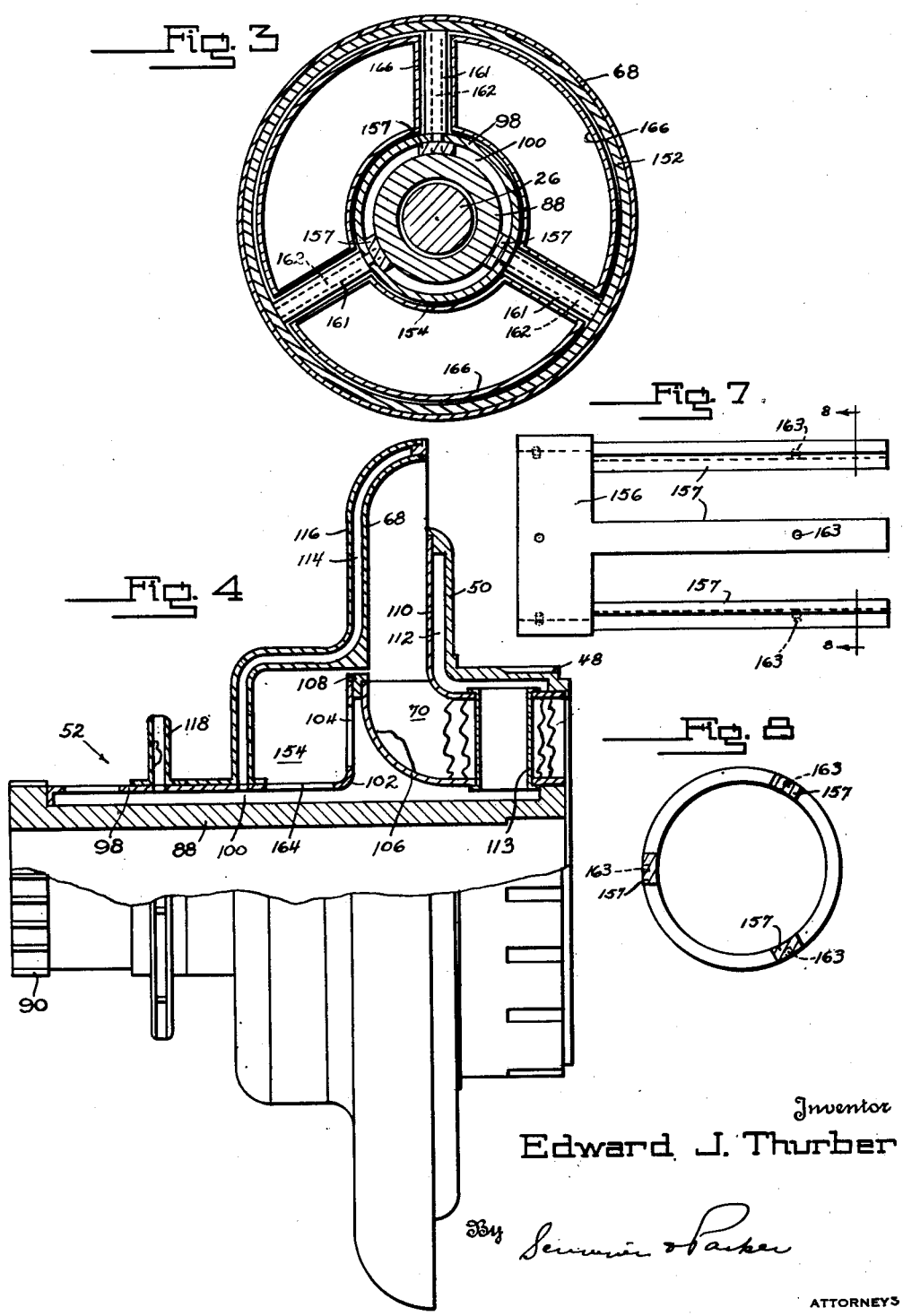

Patented Nov. 4, 1952

2,616,303

UNITED STATES PATENT OFFICE 2,616,303

TORQUE CONVERTER

Edward J. Thurber, New Orleans, La., assignor to The Thurber Corporation, New Orleans, La., a corporation of Louisiana Application October 6, 1948, Serial No. 53,026

37 Claims. (Cl. 74—472)

This invention relates to torque converters and more particularly to hydraulic variable speed transmissions of the type wherein the torque is multiplied and the power is transmitted through the cooperative effect of impeller drive members, turbine driven members and the circulation of a working fluid in a closed path through these members.

In conventional torque converters a stationary reactionary member is employed between the turbine and impeller elements. The reason for utilizing such a member is that when the fluid exhausts from the turbine, it is moving in a direction opposite to the direction of rotation of the impeller, and the fluid must be turned in the direction of the impeller before it reaches the latter. Such stationary reactionary members employ stationary vanes having a fixed profile. Such an arrangement would be satisfactory if the exhaust from the turbine held a constant pattern. In operation however, the fluid exhaust pattern is not constant but varies with the speed of the turbine. As a result, a fixed vane profile in a stationary reactionary member cannot accommodate or adjust itself in order to meet the varying fluid exhaust pattern. The result is, that the stationary reactionary member blocks the free flow of fluid, causing the generation of heat, a decrease of the fluid velocity and a lowering of the efficiency of the converter.

In the present invention, power is transmitted from the driving members to the driven members through a system of primary and secondary impeller and turbine elements, the arrangement being such that the primary impeller and turbine elements rotate in one direction, the secondary impeller and turbine elements rotate in the opposite direction, and both sets of impellers and turbines are combined into a common drive. Due to the circulation of a working fluid through these parts in a closed path, the transmission of power is readily effected. More particularly, the invention insures an arrangement of the driving members or impellers and the driven members or turbines so that the working fluid leaves one of the members and passes directly to the next member. When the fluid reaches the secondary impeller, the latter is rotating in the same direction as the fluid exhaust from the primary turbine. In the secondary impeller, due to the higher peripheral speed, the velocity of the fluid will be increased, and the fluid will be turned and directed to the secondary turbine which latter will exhaust the fluid in the same direction of rotation as the primary impeller. The cooperating elements such as impellers, turbines and guide members are so arranged, rotated and shaped, that no preceding element can crowd or underfeed the next element.

Accordingly, one of the principal objects of the present invention is to provide in a hydraulic transmission of the above type, a novel construction wherein abrupt changes in the course of the working fluid are avoided, thus materially decreasing losses in efficiency due to the generation of large amounts of heat and undesirable decreases in the velocity of the fluid.

Another object is to provide a novel hydraulic transmission construction embodying primary and secondary impellers together with primary and secondary turbines, which are so constituted that the secondary turbine and impeller cooperate to direct, guide and increase the fluid capacity without abrupt or sudden changes in the direction of flow, and where the fluid exhaust from the secondary turbine is moving in the same direction as the primary impeller.

Still another object resides in constructing and arranging the impeller, turbine and fluid guiding members so that overfeeding of succeeding members and losses in the velocity of the working fluid are prevented.

Another object is to provide a novel controlling mechanism for a hydraulic transmission of the above type which is highly efficient in its operation, and is well adapted, but not limited for use with automotive vehicles.

A further object comprehends a construction which avoids the use of costly and separate mechanical clutches by controlling the effectiveness of the fluid working circuit in a novel manner.

Still another object resides in the provision of a single control lever which is effective in its operation to disconnect the driven shaft from any driving member, connect the driven shaft to the turbine drive for forward or reverse, control the hydraulic transmission to release the same for free rotation and connect the driving shaft directly to the driven shaft for direct drive.

A further object is to provide a novel arrangement for combining the torque derived from the primary and secondary turbines of the transmission, thus resulting in a material increase in power.

A still further object resides in the provision of a novel cooling arrangement for the parts of the transmission, so arranged as to avoid the pocketing of heat within the interior of the fluid circuit.

Still another object is to provide cavities, which would otherwise accumulate surplus working fluid, with fillers or heat transfer members which communicate with the exterior of the hydraulic circuit and efficiently convey heat generated and stored in the fluid to the outside atmosphere.

A still further object is to provide a transmission of the above type which includes relatively few parts which are constructed and arranged as to present an unusually compact, readily controllable and highly efficient structure.

Other objects and novel features of the invention will appear more fully hereinafter from a consideration of the following detailed description when taken in connection with the accompanying drawings illustrating one form of the invention. It is to be expressly understood, however, that the drawings are utilized for purposes of illustration only and are not to be taken as a definition of the limits of the invention, reference being had for this purpose to the appended claims.

In the drawings, wherein similar reference characters refer to similar parts throughout the several views;

Fig. 1 is a side view partly in section of a fluid transmission embodying the principles of the present invention;

Fig. 2 is a fragmentary sectional view of the transmission taken substantially along line 2—2 of Fig. 1;

Fig. 3 is a sectional view taken substantially along line 3—3 of Fig. 1 and illustrates the ring valve for controlling the fluid circuit;

Fig. 4 is a side view partly in section of the novel fluid guide member and illustrates certain of the construction for efficiently cooling the interior of the hydraulic unit;

Fig. 5 is a schematic side view of certain of the novel controlling mechanism employed in connection with the unit of Fig. 1;

Fig. 6 is a partial sectional view taken substantially along line 6—6 of Fig. 1 and illustrates the cooperative relationship between the secondary impeller and the secondary turbine;

Fig. 7 is a side view of the sleeve for controlling the operation of the ring valve, and Fig. 8 is a sectional view taken substantially along line 8—8 of Fig. 7.

Referring more particularly to Fig. 1, the novel hydraulic power transmission of the present invention is illustrated therein as comprising a fluid unit 10 arranged to drivably connect driving and driven shafts 12 and 14 respectively, the driving shaft being rotatably supported in main casing 16 by means of bearings 18, and the driven shaft being mounted in a selector clutch housing 20 through bearing 22. As shown, the driving shaft 12 is splined at 24 to an intermediate impeller and control shaft 26 which is projected through the unit 10 and is rotatably supported within the hollow driven shaft 14 in any suitable manner. As will appear more fully hereinafter, the shaft 26 is employed not only for driving the impellers of the unit 10, but also for securing desirable controlling features at the will of the operator.

One of the novel features of the present invention resides in the construction and arrangement of the fluid unit 10 which provides a dual impeller and turbine structure arranged to avoid abrupt and sudden changes in the direction of the flow of the working fluid and to dissipate any heat generated in the latter in a highly effective manner. As shown, the unit 10 includes a primary impeller 28 which is suitably splined at 30 to the intermediate shaft 26, and is provided with a plurality of spaced-apart outwardly extending vanes or blades 32 which are gradually curved in a direction opposite to direction of rotation of the primary impeller, see Fig. 2. A secondary impeller 34 is positioned radially outwardly of the primary impeller 28 and is provided with a plurality of blades or vanes 36 which are gradually curved in a direction opposite to the direction of rotation of the secondary impeller, see Fig. 2.

Means are provided for positively driving the secondary impeller 34 from the primary impeller 28 and in a direction opposite to the direction of rotation of the latter. As shown, such means includes a reversing gearing comprising an impeller ring gear 38 carried by the primary impeller 28, a plurality of pinions 40, and a driving gear 42, the latter being connected with the secondary impeller 34 through a toothed clutch 44. Pinions 40 are carried by a pinion carrier 46 which is splined at 48 to the rear disk 50 of a normally stationary fluid guide member 52, the said disk 50 being provided with a hub portion for rotatably mounting the driving gear 42. In this manner, see Figs. 1 and 2, it will be readily seen that the secondary impeller 34 will be rotated in a clockwise direction, as denoted by the arrows A, upon counterclockwise rotation of the primary impeller 28, as indicated by the arrow B, when viewed from the direction of the arrow R in Fig. 1. Such an arrangement insures an outward radial flow of working fluid followed by a lateral flow from the side of the secondary impeller 34, it being noted from Fig. 1, that the construction of the latter is such that the direction of the flow of fluid in the fluid working circuit, as shown by the arrows 54, is gradually changed from an outward radial flow to a lateral flow.

In order to transmit torque from the primary and secondary impellers 28 and 34 respectively, to the driven shaft 14 through the fluid circulating in the path 54, the present invention provides a novel turbine construction which cooperates with the impellers in a highly efficient manner. As shown, such construction includes a primary turbine 56 which is fixed in any suitable manner to a primary turbine sleeve 58 which is rotatably supported on the intermediate shaft 26. A plurality of vanes or blades 60, are carried by the primary turbine 56, and these are spaced apart and generally curved in the same direction as the blades 32 of the primary impeller 28. From this arrangement, it will be appreciated from Fig. 2, that with the primary impeller 28 rotating in the direction of the arrow B, the fluid traveling from the primary impeller blades 32 to the primary turbine blades 60 will cause the primary turbine 56 to rotate in the same direction as shown by the arrow C. It will also be noted from Fig. 2 that the fluid exhausting from the primary turbine 56 takes the direction as shown by the arrows D which is opposite to the direction of rotation of the primary turbine 56. Since the secondary impeller 34 is geared to rotate in the opposite direction from that of the primary impeller 28, it will be clear that the direction of rotation of the former will be the same as the direction of travel of the fluid as it is exhausted from the primary turbine 56, see the arrows A and D. Thus the fluid will be flowing in a direction such as to assist the rotation of the secondary impeller 34 as the fluid strikes the concave sides of the vanes 36. Thereafter, the fluid continues to flow outwardly, under the influence of centrifugal force, the fluid velocity is increased over its initial velocity, and its direction is gradually changed so as to flow laterally, as heretofore described.

For the purpose of completing the fluid circuit and establishing the toroidal fluid path 54 characteristic of hydraulic devices of the general type to which the invention appertains, the invention provides a novel secondary turbine structure 62 which cooperates with the normally stationary guide member 52 and functions to deliver the fluid to the primary impeller 28 without any sudden changes in the direction of flow and without overfeeding the latter. In the form of the invention illustrated, the secondary turbine 62 includes a plurality of vanes or blades 64 which are so curved as to cause the turbine to move in a clockwise direction, see arrow E of Fig. 6, when viewed at the top of the unit in the direction of the arrow R. Thus the secondary turbine rotates in the same direction as the secondary impeller. The fluid exhausting from the secondary impeller and the secondary turbine on the other hand will be moving in an opposite direction, see arrows F of Fig. 6, and such fluid is received within the space 66 defined by the rear disk 50 and a forward disk 68 of the member 52 and finally delivered to the primary impeller 28 by way of a plurality of hollow guide vanes 70 carried by member 52. Previously the latter vanes are gently curved in the direction of the fluid flow, as the fluid is exhausted from the secondary turbine, so that the direction of flow of the fluid as it is delivered to the vanes 32 of the primary impeller 28 will be the same as the direction of rotation of the latter.

As shown, the secondary turbine 62 is carried by the casing of the unit 10, such casing including a forward section 72 which is rotatably mounted upon a bearing 74, and a rear section 76 to which a secondary turbine sleeve 78 is secured in any suitable manner. The turbine 62 is mounted on the forward section 72, as by means of a plurality of screws 80, and both sections of the casing are secured together by a plurality of bolts 82. As will be readily seen from Fig. 1, the rear section 76 is formed to provide a pair of annular spaced apart rings 84 and 86 for rotatably supporting the secondary impeller 34.

From the foregoing description it will be seen that the guide member 52 not only serves to guide the working fluid in its travel from the secondary turbine to the primary impeller, but also functions as a support for the reversing gear carrier 46. In addition to these desirable functions, the member 52 also provides a novel construction for effectively dissipating heat which may be generated due to the circulation of the working fluid. More particularly, the guide member 52 includes a main sleeve 88 which surrounds the intermediate shaft 26 and is rotatably mounted thereon in any suitable manner. The forward portion of the sleeve 88 is provided with a series of gear teeth 90 with which a gear brake 92, splined at 93 to a stationary arm 94, cooperates in maintaining the member 52 stationary or allowing it to be released in accordance with longitudinal movement of the shaft 26. For example in the position shown in Fig. 1, the sleeve 88 and the member 52 are held stationary by cooperation of the parts 90, 92 and 94. Upon movement of the shaft 26 to the left, however, the brake 92 will be moved, through an actuating flange 96 fixed to the shaft 26, to disengage the teeth 90. Thereupon the sleeve 88 and member 52 will be released. The conditions under which this control is effected will be referred to more fully hereinafter.

Surrounding the main sleeve 88 is a secondary sleeve 98 which is formed to provide a ventilating space 100 between the sleeves. At its rear end, the sleeve 98 is provided with a flanged portion 102 having a plurality of openings 104 therein, such flanged portion being connected to a hub element 106 as by means of an annular ring 108. The rear disk 50 is connected at its periphery with a disk 110, these elements being spaced slightly from each other to define a ventilating chamber 112 which communicates with the chamber 100 by way of a plurality of tubes 113, extending through hollow vanes 70, opposite ends of the tubes being respectively supported by the disk 110, and the hub element 106, as clearly shown in Figs. 1 and 3. From this construction, it will be readily ascertained that free communication is established between the ventilating chamber 112, located within the toroidal path 54 of the working fluid, and the ventilating chamber 100.

In order to provide for additional ventilation and cooling of the parts, the guiding member 52 also includes a ventilating space 114 defined by a disk 116 which is spaced from but connected at its periphery to the forward disk 68. Such space 114 also communicates with the space 100 as will be clear from an inspection of Figs. 1 and 4. The latter space is in constant communication with a bladed exhaust ring 118 which connects the space 100 and the ventilating spaces 112 and 114 communicating therewith, with the atmosphere through the exhaust ring 118.

In the form of the invention illustrated, the forward casing section 72 is provided with a plurality of ventilating vanes 120 having a cover 122 arranged to direct a flow of cooling air past the exhaust ring 118, between the vanes 120 and outwardly at the periphery of the unit 10 adjacent fins 124 on the exterior of the forward casing section 72. The cooling air passing by the exhaust ring 118 materially assists the ventilation of the chambers connected with such ring, the action in this respect being in the nature of an ejector.

In like manner, the rear casing section 76 is provided with a plurality of ventilating vanes 126 having a cover 128, while the section 76 at its periphery, has associated therewith, a plurality of cooling fins 130. As will be readily seen from Fig. 1, the unit 10 is housed within a stationary casing 132 having forward and rear sections 134 and 136 which are connected together by a series of bolts 138. A plurality of inlet openings 140 are provided for the intake of cooling air, the latter being exhausted through an ejector opening 142. Thus, in the case of an automotive vehicle installation, when the vehicle is moving forward, cool fresh air is drawn in through air intake openings 140 in the stationary casing 132 and the rotation of the fluid unit 10 draws in the air at its hub and exhausts the air at its periphery. Furthermore, the forward movement of the vehicle creates an air stream which passes over the air exhaust opening 142 in the stationary casing 132 to aid in exhausting the air from the casing. Thus, a continuous circulation of cool fresh air is passed over and around the fluid unit 10 in order to effectively cool the latter.

In order to further assist in the ventilation and cooling of the working parts, the secondary turbine 62 is formed with an annular recess 144 which is adapted to communicate with the atmosphere by means of a plurality of openings 146 spaced about the periphery thereof. The secondary impeller 34 is provided with a somewhat similar ventilating arrangement, the same comprising an annular filler tank 148 provided with a plurality of openings 150, see particularly Fig. 2.

A further important feature of the invention resides in the provision of a novel construction for controlling the effectiveness of the fluid working circuit 54, and in the form of the invention illustrated, such construction includes a fluid control valve 152, see Figs. 1 and 3. More particularly, the valve 152 is of ring-like or drum form which is mounted within a chamber 154 defined by the flanged portion 102 of the sleeve 98 and the hub portion of the disk 68. In the position shown in Fig. 1, the valve 152 is retracted and hence offers no obstruction to the free flow of the working fluid in the circuit 54. When projected to the right, as viewed in this figure, however, the valve 152 contacts the disk 110 and completely interrupts the flow of the working fluid. Under these conditions, the transmission of torque from the impellers 28 and 34 to the turbines 56 and 62 is likewise completely interrupted and the driven members are thus effectively disconnected from the driving members.

A novel arrangement is provided for controlling the movements of the valve 152 and preferably the construction is such that the movements may be coordinated with certain of the conventional controlling elements of an automotive vehicle. More particularly, valve controlling sleeve 156 having a plurality of longitudinally extending fingers 157, is positioned within the space 100 between the sleeves 88 and 98 and arranged to be shifted in said space by means of a yoke or collar 158, secured to the sleeve 156 as by a pin 159, a suitable slot 160 being provided in the sleeve 98 to accommodate the pin during shifting movement of the yoke 158 to the right, as viewed in Fig. 1. As shown, the control ring valve 152 is provided with a plurality of hollow spokes 161 which contain suitable pins 162, the ends of which project into openings 163 provided in the ends of the fingers 157. In this manner, axial movements of the sleeve 156 will cause corresponding axial movements of the ring valve 152, it being pointed out that suitable slots 164, Fig. 4, are provided in the sleeve 98 for accommodating such movements of the pins 162. Preferably, the chamber 154 is filled with a plurality of cavity fillers or tanks 166 which communicate with the openings 104, this construction insuring ventilation and cooling of the interior of the ring valve 152, as well as avoiding accumulation of surplus fluid in chamber 154.

In order to control the movements of the ring valve 152, a lever 168 pivoted at 170 to a stationary bracket 172, has one end 174 thereof associated with the yoke 158, and the other end 176 thereof operatively connected with certain of the automotive vehicle control elements. As shown, Fig. 5, such elements include an accelerator pedal 178 pivotally mounted at 180 to a suitable bracket 182 and being operatively connected to a carburetor throttle rod 184 by means of a bell crank lever 186. Preferably a spring loaded connection 188 is interposed between the rod 184 and one arm of the lever 186 for a purpose which will appear more fully hereinafter. An operating link or arm 190 is pivoted to the upper end 176 of the lever 168 and has its opposite ends pivotally connected with bell crank levers 192 and 194. As shown, the lever 192 is arranged to be operated in a clockwise direction about its pivotal mounting 196, as by a vertically movable rod 198, while the lever 194 is mounted for movement in a similar manner by shifting of a rod 200. The accelerator pedal 178 is coordinated with the rods 198 and 200 in such a manner that operation thereof in opposite directions from the position indicated will serve to selectively shift the said rods downwardly. Thus in the event the pedal 178 is rocked to the position M, rod 200 will be shifted to cause counterclockwise movement of the lever 168 about its pivot in order to shift the valve 152 and completely interrupt the circulation of fluid in the path 54 as heretofore described. On the other hand, should the pedal 178 be rocked past the full throttle position N to the position O, the rod 198 will affect movement of the lever 168 in the same direction. It will be understood that movement of the pedal 178 from position N to position O is permitted by reason of the spring loaded connection 188 interposed in the carburetor throttle linkage. It is also desired to point out that the connections between the rod 198 and the lever 168 are preferably such that the valve 152 will only partially interrupt the fluid circulation in the path 54 when the pedal 178 reaches the position O. The advantages of this arrangement will appear more fully hereinafter.

Preferably, the lever 168 is also operatively connected to the vehicle brake operating pedal 202 so that upon application of the vehicle brakes, the circulation of fluid in the path 54 will be interrupted in order to disconnect the impeller and turbine members. As shown, such connection includes an arm 204 secured to the brake pedal 202 and cooperating with an arm of the lever 194 through a spring 206. Thus, as the pedal 202 is pivoted about the pivotal mounting 208 therefor, to apply the vehicle brakes through any suitable linkage 210, the arm 204 will rock the lever 194 in a clockwise direction in order to shift the link 190 and correspondingly close the valve 152 through the lever 168 and the connections heretofore referred to. It will be clear that the use of the spring 206 allows complete freedom of movement of the pedal 202 for proper and effective brake operation. Thus the pedal 202 has a primary function of closing the ring valve 152 and arresting the fluid circulation in order to effectively disconnect the driving and driven shafts, and thus neutralize the transmission. Pedal 202 also has a secondary function of applying the brakes to stop the driven shaft from rotating after motion of the vehicle is arrested.

It will be readily understood from the foregoing that during operation of the fluid unit 10 with the establishment of the fluid working circuit 54, the primary turbine sleeve 58 and the secondary turbine sleeve 78 will be rotating in opposite directions. For example and viewing these parts from the front of the unit, in the direction of the arrow H, shaft 26 and sleeve 58 will be rotating clockwise while sleeve 78 will be rotating counterclockwise. In order to combine the torque outputs from the sleeves 58 and 78 and hence the outputs of the primary and secondary turbines 56 and 62 respectively, a novel arrangement is contemplated. More particularly, and as shown in Fig. 1, such an arrangement includes a reversing gearing constituting a transfer mechanism 212. Such mechanism includes a drive ring 214 which is splined at 216 to the secondary turbine sleeve 78, and which is connected to a secondary transfer gear 218 through a one-way clutch 219, and carries a cover member 220 provided with clutch teeth 222. A plurality of pinions 224 mesh with the gear 218, and the former are also arranged to mesh with a primary transfer gear 226 which is splined at 228 to the primary turbine sleeve 58. A pinion carrier 230 is provided for supporting the pinions 224 and such carrier, in the position shown in Fig. 1, is held stationary in the following manner. A locking and reversing sleeve 231 is arranged to be shiftable on the primary turbine sleeve 58 and is provided at its forward end with clutch teeth 232 to engage corresponding clutch teeth 234 formed on the pinion carrier 230. With the latter teeth in engagement, clutch teeth 236 formed on the sleeve 231 are engaged with similar clutch teeth of an anchor member 240 secured in any suitable manner to the stationary transfer housing 242. Thus with the pinion carrier 230 held stationary, it will be readily seen that the torque of the secondary turbine is combined with that of the primary turbine through the sleeve 78, drive ring 214, one-way clutch 219, secondary transfer gear 218, pinions 224 and primary transfer gear 226, it being recalled that the latter is splined to and thus drivably connected with the primary turbine sleeve 58. Thus the combined torques are delivered to the sleeve 58 for subsequent use in driving the driven shaft 14.

A further important feature of the invention resides in the provision of a novel controlling mechanism for controlling the action of the fluid unit 10 in certain respects, and for securing various driving connections between driving shaft 12, the primary and secondary turbine sleeves 58 and 78 respectively, and the driven shaft 14, all at the will of the operator. More particularly, and as shown in Fig. 1, the selector housing 20 is provided with a forward shift rail 244 and a reverse shift rail 246, these rails being spaced apart and lying in a horizontal plane. The forward shift rail 244 slideably carries a shifting fork 248 which is operatively connected with a master yoke 250 in such a manner as to shift the latter to the left, as viewed in Fig. 1, in order to selectively establish the desired driving connections. In a similar manner, a reverse shifting fork 252 is slideable along the reverse shift rail 246 in order to control the position of the sleeve 231. A selector control lever 254 is universally mounted in the casing 20 and provided with a lower end 256 for selective engagement with either of the shifting forks 248 or 252 for effecting the aforesaid shifting movements. Preferably, a spring 258 is associated with the lever 254 in order to resiliently maintain the latter in a position where the shifting fork 248 is engaged by the lower end 256 thereof. If desired, each of the shifting forks may be provided with conventional ball detents 260 which are engageable with suitable notches 262 formed in the shift rails in order to yieldingly maintain the said forks in their adjusted positions. While not illustrated, it is contemplated that a shifting lever mounted beneath the steering wheel of the vehicle will be connected through a suitable linkage with the lever 254 in order to control the operation of the latter.

For establishing the various driving connections, the master yoke is provided with a plurality of gear type clutches and is also splined at 264 to the driven shaft 14 so as to be axially movable with respect to the latter. More particularly, the aforesaid clutches comprise a reverse clutch member 266, a turbine clutch member 268, and a direct drive clutch member 270, the latter being firmly secured to the intermediate shaft 26 by a pin 272 and being provided with a yoke or collar 274 for receiving the end of an actuating pin 276 carried by the master yoke 250. Due to this latter construction, it will be readily seen that the clutch member 270 and the intermediate shaft 26 to which it is secured, are moved axially in accordance with all shifting movements of the master yoke 250. The reverse clutch member 266 is adapted to cooperate with a complementary reverse clutch member 278 carried by the sleeve 231, while the clutch members 268 and 270 respectively engage a complementary turbine clutch member 280 and a direct drive clutch member 282. The latter two clutch members are formed on a clutch collar 284 which is secured to the primary turbine sleeve 58 in any suitable manner.

In operation, and assuming that the fluid unit 10 has been filled with sufficient fluid to constitute the working circuit 54 when the unit is in operation, the selector lever 254 is moved to the neutral position L, and the engine is started. This causes rotation of the shafts 12 and 26 and the primary impeller 28 connected therewith, all of these parts rotating in a counterclockwise direction when viewed in the direction of the arrow R, see Figs. 1 and 2. Fluid exhausting from the primary impeller will take the general direction as shown by the arrows D of Fig. 2 and such fluid will strike the blades 60 of the primary turbine 56 and cause counterclockwise rotation of latter as indicated by the arrow C. Since the secondary impeller 34 is geared through the gearing 38, 40 and 42 to the primary impeller 28 so as to be driven in a clockwise direction, see arrows A of Fig. 2, and the fluid exhausting from the primary turbine 56 is also moving in a clockwise direction, it will be readily understood that such fluid assists in rotating the secondary impeller when it strikes the curved vanes 36 of the latter. Under the continued influence of centrifugal force, the fluid moves to the inside periphery of the secondary impeller 34 where its initial velocity is increased and the fluid is turned and directed axially against the vanes 64 of the secondary turbine 62, see Fig. 6. The action of the fluid flowing axially through the secondary turbine will rotate it in the same direction as the secondary impeller, as indicated by the arrow E of Fig. 6, and the fluid exhausting therefrom will be generally directed in a counterclockwise direction as shown by the arrows F, which is the direction of rotation of the primary impeller 28. Thereafter the fluid working circuit is completed by the flow of the fluid radially inwardly through the space 66 of the guide member 52, and past the vanes 70 which as heretofore stated, are gently curved to maintain the counterclockwise movement of the fluid and to deliver the latter to the primary impeller 28 which, it will be recalled, is also rotating in a counterclockwise direction, see arrow B. From the foregoing, it is seen that the path of the fluid follows a free flow with no abrupt or sudden changes of direction which would otherwise create turbulence and the generation of heat and would result in a lowering of the efficiency of the converter. Moreover the arrangement is such that overfeeding or underfeeding of any succeeding element of the unit 10 is prevented.

Under certain conditions, and especially when initially establishing the fluid working circuit 54 following a condition of rest, there may be some tendency for fluid to accumulate within the space housing the reversing gearing 38, 40 and 42. For the purpose of expelling such fluid and returning it to the working circuit, a plurality of vane members 290 are attached to the gear 42 and arranged to direct the fluid axially outwardly into the space 66.

It is well known that during the operation of torque converters of the fluid type, a considerable amount of heat is generated in the working fluid and parts associated therewith, and various arrangements have been proposed in an effort to dissipate such heat. The interior cooling and ventilating means of the present invention, heretofore described in detail provides a highly efficient construction for effecting such heat dissipation. For example, and referring to Fig. 4, it will be noted that the ventilating spaces 112 and 114 are arranged on opposite sides of one leg of the fluid working circuit 54 and these spaces communicate with the exhaust ring 118 by way of the annular chamber 100. Additional and efficient cooling means are provided by the vaned casing parts 72 and 76, the fins 124 and 130, and the parts 144, 148 and 166. It is also pointed out that the fluid unit 10 is rotatably mounted in the stationary casing 132 and during operation, draws in cool fresh air through openings 140 and exhausts the air through the exhaust port 142. Hence, the entire fluid unit 10 is provided with a constant circulation of cool fresh air. It will be noted from Fig. 4 that the fluid guide member 52, while comprising a plurality of separate parts, nevertheless is so constituted as to provide a unitary assembly for association with the impeller and turbine members. Thus, all of the constituent elements are welded together in the manner shown in Fig. 4, it being understood that the valve 152 is positioned as shown in Fig. 1 prior to the welding operation.

During operation of the fluid unit 10, as above set forth, the torques derived from the secondary turbine 62 and the primary turbine 56 are combined in the transfer gearing 212 and delivered to the primary turbine sleeve 58. Thus this sleeve and the clutch member 282 will be rotated in a counterclockwise direction when the unit is viewed from the direction indicated by the arrow R, Fig. 1. This is the same direction of rotation as the driving shaft 12 and the intermediate shaft 26. Under these conditions, the pinion carrier 230 of the transfer gearing 212, is maintained stationary by means of the clutch 236 on the sleeve 231 which engages the stationary part 240. With the unit functioning in this manner, the fork 248 on the forward shifting rail 244 may be moved for effecting various forward driving conditions.

In the event that it is desired to establish a forward drive through the torque converter in order to utilize the torques derived from the primary and secondary turbines 56 and 62 respectively, it is first necessary to interrupt the transmission of torque between the impellers and the turbines through operation of ring valve 152. This is effected by rocking the accelerator pedal 178 from the neutral position illustrated in Fig. 5, to the position M in order to depress the rod 200 and shift the valve 152 to the right as viewed in Fig. 1, to interrupt the flow of the fluid in the working circuit 54. As understood from the previous description, such movement of the valve 152 is accomplished through the bell crank lever 194, link 190, lever 168, collar 158, sleeve 156 and the connection 162 between the latter sleeve and the ring valve 152. Preferably, a centering or neutralizing spring, not shown, is associated with the lever 168 in order to resiliently maintain the same and the valve 152 in the neutral positions illustrated in Fig. 1, and it is understood that when the ring valve is operated as above set forth, the lever 168 is moved in a counterclockwise direction about its pivotal mounting 170 and against the tension of the centering spring. However, the centering or neutralizing spring keeps the valve 152 in an open position and returns the valve to the open, neutral position shown in Fig. 1 after being actuated by pedals 178 or 202.

Following the operation of the ring valve 152, the turbine members 56 and 62 will be effectively disconnected from the impeller members 28 and 34 so that all transmission of torque between these parts ceases. When this condition occurs, the operator moves the selector lever 254 to the position S as shown in Fig. 1, in order to bring the turbine clutch members 268 and 280 into engagement. Thereafter, the accelerator pedal 178 is moved to its normal position or beyond for opening the carburetor throttle, and the ring valve 152 is returned to the position indicated in Fig. 1. At this stage, the flow of the working fluid in the toroidal path 54 is re-established and the drive from the fluid unit will be transmitted from the primary turbine sleeve 58 to the driven shaft 14 by way of the clutch elements 280 and 268, and the master yoke 250 which is splined to the driven shaft 14 at 264.

It will be understood that during movement of the master yoke 250 to the left as viewed in Fig. 1, to establish the turbine drive, intermediate shaft 26 will also be moved a slight distance to the left through the connection between the master yoke 250 and the clutch collar 274 which is affixed to the shaft 26. When this movement occurs the brake 92 is also moved a slight distance to the left but insufficient to effect disengagement between the stationary arm 94 and the teeth 90 formed on the sleeve 88 of the fluid guide member 52. Thus, the latter member will remain in a stationary condition.

In the event that the selector lever 254 is thereafter moved to the position T, following interruption of the fluid working circuit 54 by closing of the ring valve 152 as above set forth, the turbine drive between the clutch members 280 and 268 is maintained. However, the intermediate shaft 26 is moved a sufficient distance to the left as to effect disengagement between the teeth 90 and the brake 92. With the fluid guide member 52 thus released from its stationary condition, it will be readily understood that the reversing pinion carrier 46 carried by the rear disk 50 of such member will be free for rotation with the guide member 52, and under these conditions, the reversing gearing connecting the primary impeller 28 and the secondary impeller 34 will be effectively disconnected. This allows the impellers and turbine members to follow the direction of rotation of the fluid in the unit 10, which as heretofore stated, is being influenced to rotate in a counterclockwise direction. The secondary turbine 62 and the casing comprising sections 72 and 76, hence rotate in the same direction as the primary turbine 56, this being permitted by reason of the one-way or overrunning clutch 219. Thereafter, it is only necessary to move the ring valve 152 to open position in order to re-establish the fluid working circuit 54 and obtain the drive solely through the primary impeller 28 and the primary turbine 56, which latter is connected with the primary turbine sleeve 58 which is clutched to the driven shaft 14.

In order to establish a direct drive between the driving shaft 12 and the driven shaft 14, thus isolating the fluid unit 10, the ring valve 152 is moved to its closed position and the selector lever 254 is then moved to the position indicated at V in Fig. 1. This action causes movement of the master yoke 250 and the direct drive clutch 270 a sufficient distance to the left as to bring the teeth of the latter clutch into engagement with the complementary direct drive clutch 282. Since the clutch member 284 is maintained in driving relationship with the master yoke 250 through the engaged clutch members 280 and 268, it will be readily seen that the direct drive may be established between the driving and driven shafts. Thereafter, it is only necessary to move the accelerator pedal 178 in a conventional manner in order to control the operation of the vehicle in the direct drive.

In establishing a reverse drive, the ring valve 152 is first moved to its closed position and the selector lever 254 is thereafter moved to pick up reverse shifting fork 252. Shifting of the lever 254 to the position K, then establishes the reverse gear relation in the following manner. Upon movement of the reverse shift rail 252 to the right, as viewed in Fig. 1, sleeve 231 will also be moved to the right. This causes a de-clutching action between the clutch members 232, 234 as well as a de-clutching action at the clutch 236. The clutch member 232 will then be shifted into engagement with the clutch member 222 of the cover 220 and the sleeve 231 will then be rotated in a clockwise direction by reason of the fact that the cover 220 is connected to the secondary impeller sleeve 78. A slight continuing movement of the sleeve 231 will then bring the reversing clutch members 266 and 278 into engagement in order to effect a reverse drive of the driven shaft 14 through the master yoke 250. Here again, the fluid working circuit 54 is re-established by opening of the valve 152 through movement of the accelerator pedal in a forward direction from the position M. It will be understood, of course, that the reverse gear relation is established after the lever 254 has been returned to the neutral position L, so that the fluid guide member 52 is locked in a stationary condition through the clutch 92 and the cooperation of the latter with the clutch teeth 90 and 93.

From the foregoing, it will be readily perceived that the ring valve 152 functions in a highly efficient manner in order to interrupt the transmission of torque between the impeller and the turbine members. Thus the necessity of utilizing a separate and costly mechanical clutch arrangement is completely avoided.

In the event that the vehicle is being driven by the fluid unit 10, and the load imposed upon the engine has decreased its speed and torque, the following operation is followed in the event that a sudden and quick acceleration of the vehicle is desired. The accelerator pedal 178 is moved beyond its full throttle position N to the position O as indicated in Fig. 5. This action, as heretofore stated, is permitted by reason of the inclusion of the spring loaded connection 188 in the linkage between the accelerator pedal and the carburetor throttle. During movement of the accelerator pedal as thus indicated, the rod 198 is moved downwardly in order to effect counter-clockwise movement of the lever 168 about its pivotal mounting 170. This action causes a partial closure of the ring valve 152 which will relieve the engine of a portion of its fluid load in order to permit an increase in its rate of speed. As soon as this occurs, the velocity of the fluid in the working circuit 54 will increase and the torque delivered by the fluid unit will be also increased. Thus, with this arrangement, a sudden and quick acceleration of the vehicle may be obtained by merely moving the accelerator pedal beyond its normal full throttle position. Upon return of the accelerator 178 to its throttle operable position, the valve neutralizing spring previously described as being associated with the lever 168, provides power means to return the valve 152 to a neutral position, thus again permitting a free flow of the fluid in the circuit 54.

The present invention thus provides a novel hydraulic torque converter combined with a novel control system which is arranged to provide a highly advantageous construction. For example, one of the important features resides in the use of the novel fluid guiding member 52 which is formed to not only guide the fluid during its travel, but also to serve as an efficient means for the dissipation of heat generated interiorly of the converter. A further feature resides in the construction and cooperation of the impeller and turbine members, it being clear from the foregoing description, that these members are so arranged that no sudden or abrupt changes in the direction of the fluid flow occurs, and overfeeding or underfeeding of each succeeding unit is completely avoided.

In addition to the above, the control system is such that the torques of the primary as well as the secondary turbines are combined in order to increase the power output of the converter. Also, the drive selector construction provides a simplified and efficient manner of selecting and establishing the various driving conditions in cooperation with the fluid control valve, which latter avoids the necessity of complicated and costly mechanical clutches.

It will be readily understood that while one embodiment of the invention has been shown and described herein, various modifications may be resorted to without departing from the spirit of the invention. For example, the construction is well adapted for a variety of uses other than for installation in an automotive vehicle. Also, the guide vanes 70 of the guide member 52 may be extended to the secondary turbine 62 if desired, and by changing the profile of such vanes, the fluid guide member may be employed as a conventional reactionary member. In addition, cooling air may be forced through the ventilating space 100 and the cooling passages connected therewith. Those skilled in the art will perceive various other modifications and changes without departing from the essence of the invention. Reference will therefore be had to the appended claims for a definition of the limits of the invention.

What is claimed is:

1. A hydraulic variable speed power transmission comprising a casing containing a working fluid, a rotatable bladed primary impeller for directing said fluid radially outwardly, a radially extending bladed primary turbine for receiving the radially directed fluid, a bladed rotatable secondary impeller arranged to receive the fluid exhausted from the primary turbine and to exhaust said fluid in an axial direction, means for drivably connecting the primary and secondary impellers for rotating the latter in a direction opposite to that of the former, a rotatable bladed secondary turbine for receiving the fluid exhausted from the secondary impeller, and a fluid guide member for receiving the fluid from the secondary turbine and for returning said fluid to the primary impeller.

2. A hydraulic variable speed power transmission comprising a casing containing a working fluid, a rotatable bladed primary impeller for directing said fluid radially outwardly, a radially extending bladed primary turbine for receiving the radially directed fluid, a bladed rotatable secondary impeller arranged to receive the fluid exhausted from the primary turbine, increase its velocity and to exhaust said fluid in an axial direction, means connected with the primary impeller for rotating the secondary impeller in a direction opposite to that of the primary impeller, a rotatable bladed secondary turbine for receiving the fluid exhausted from the secondary impeller, and a fluid guide member for receiving the fluid from the secondary turbine and for returning said fluid to the primary impeller.

3. A hydraulic variable speed transmission of the character set forth in claim 2, which comprises in addition, controlling means operable to cause rotation of all of said impellers and turbines in the same direction.

4. A hydraulic variable speed transmission of the character set forth in claim 2, which includes means for rotating one of said turbines and one of said impellers in either direction at the will of the operator.

5. A hydraulic variable speed transmission of the character set forth in claim 2, wherein the means connected with the primary impeller comprises a ring gear connected with the secondary impeller, a second ring gear connected with the primary impeller, and a pinion carrier having a plurality of pinions operatively connecting said gears.

6. A hydraulic variable speed transmission of the character set forth in claim 5, which comprises in addition, means shiftable at the will of the operator for maintaining said carrier stationary, or for releasing it for free rotation.

7. A hydraulic variable speed power transmission comprising a casing containing a working fluid, a rotatable bladed primary impeller for directing said fluid radially outwardly, means for rotating the primary impeller in one direction, a radially extending bladed primary turbine for receiving the radially directed fluid and rotatable in the same direction as the primary impeller, a bladed rotatable secondary impeller arranged to receive the fluid exhausted from the primary turbine and to exhaust said fluid in an axial direction, means connected with the primary impeller for rotating the secondary impeller in a direction opposite to that of the primary impeller, a rotatable bladed secondary turbine for receiving the fluid exhausted from the secondary impeller, and a fluid guide member for receiving the fluid from the secondary turbine and for returning said fluid to the primary impeller.

8. A hydraulic variable speed power transmission comprising a casing containing a working fluid, a rotatable bladed primary impeller for directing said fluid radially outwardly, means for rotating the primary impeller in one direction, a radially extending bladed primary turbine for receiving the radially directed fluid and rotatable in the same direction as the primary impeller, a bladed rotatable secondary impeller arranged to receive the fluid exhausted from the primary turbine and to exhaust said fluid in an axial direction, means connected with the primary impeller for rotating the secondary impeller in a direction opposite to that of the primary impeller, a rotatable secondary turbine having a plurality of blades arranged to receive the fluid exhausted from the secondary impeller and to be rotated in the same direction as the secondary impeller, a fluid guide member for receiving the fluid from the secondary turbine, and a plurality of vanes carried by said guide member for returning the fluid to the primary impeller and for directing the fluid to flow in a path having the same direction as the direction of rotation of the primary impeller.

9. A fluid power transmission device, comprising primary and secondary impeller members, means for driveably connecting said members for rotating the secondary impeller member in a direction opposite to that of the primary impeller member, primary and secondary turbine members, a casing containing a working fluid, said members cooperating with said fluid to direct the latter in a closed circuit to transmit torque from the impeller members to the turbine members, a fluid guide member between the secondary turbine and the primary impeller for receiving the fluid from the former and for delivering the fluid to the latter, and means associated with the guide member for variably restricting the flow of fluid in said circuit.

10. A hydraulic variable speed power transmission comprising a casing containing a working fluid, a rotatable bladed primary impeller for directing said fluid radially outwardly, means for rotating the primary impeller in one direction, a radially extending bladed primary turbine for receiving the radially directed fluid and rotatable in the same direction as the primary impeller, a bladed rotatable secondary impeller arranged to receive the fluid exhausted from the primary turbine and to exhaust said fluid in an axial direction, means connected with the primary impeller for rotating the secondary impeller in a direction opposite to that of the primary impeller, a rotatable secondary turbine having a plurality of blades arranged to receive the fluid exhausted from the secondary impeller and to be rotated in the same direction as the secondary impeller, a primary torque output member connected with the primary turbine, a secondary torque output member connected with the secondary turbine, means for operatively connecting said output members to combine the torques delivered by the turbines, and a fluid guide member for receiving the fluid from the secondary turbine and for returning said fluid to the primary impeller.

11. A hydraulic variable speed power transmission of the character set forth in claim 10 which comprises in addition, a driven shaft, and means selectively operable to connect the driven shaft with the primary torque output member or the secondary torque output member.

12. A hydraulic variable speed transmission of the character set forth in claim 10 wherein the means for operatively connecting the output members comprises a ring gear carried by one member, a second ring gear carried by the other member, and means including a plurality of pinions operatively connecting said ring gears.

13. A hydraulic variable speed transmission of the character set forth in claim 12 which comprises in addition, a carrier for said pinions, and means shiftable at the will of the operator for maintaining said carrier stationary or for releasing it for free rotation.

14. In a fluid power transmission device, primary and secondary impeller members, means for driveably connecting said members for rotating the secondary impeller member in a direction opposite to that of the primary impeller member, primary and secondary turbine members, a casing containing a working fluid, said members cooperating with said fluid to direct the latter in a closed circuit to transmit torque from the impeller members to the turbine members, a fluid guide member between the secondary turbine and the primary impeller for receiving the fluid from the former and for delivering the fluid to the latter, a driving shaft, an intermediate shaft drivably connected with the driving shaft and with the primary impeller, a driven shaft, means to combine the torques delivered by the turbines, and selectively operable means to connect the driven shaft and the intermediate shaft for direct drive, or for connecting the driven shaft with said torque combining means.

15. In a fluid power transmission device, primary and secondary impeller members, means for driveably connecting said members for rotating the secondary impeller member in a direction opposite to that of the primary impeller member, primary and secondary turbine members, a casing containing a working fluid, said members cooperating with said fluid to direct the latter in a closed circuit to transmit torque from the impeller members to the turbine members, a fluid guide member between the secondary turbine and the primary impeller for receiving the fluid from the former and for delivering the fluid to the latter, means for normally maintaining said guide member stationary, a driving shaft, an intermediate shaft drivably connected with the driving shaft and with the primary impeller, a driven shaft, means to combine the torques delivered by the turbines, and selectively operable means for connecting the driven shaft with said torque combining means or for connecting the driven shaft directly to said intermediate shaft while releasing said guide member for free rotation.

16. In a fluid power transmission device of the type having primary and secondary impellers and primary and secondary turbines, a casing containing a working fluid, said members cooperating with said fluid to direct the latter in a closed circuit to transmit torque from the impeller members to the turbine members, a fluid guide member between the secondary turbine and the primary impeller for receiving the fluid from the former and for delivering the fluid to the latter, means including a brake for normally maintaining said guide member stationary, said brake being operable to release the guide member for free rotation, a driving shaft, an intermediate shaft dravably connected with the driving shaft and with the primary impeller, a driven shaft, means to combine the torques delivered by the turbines, and selectively operable means for connecting the driven shaft with said torque combining means or for connecting the driven shaft directly to said intermediate shaft and for simultaneously operating said brake to release the guide member.

17. A device of the character set forth in claim 16 which includes in addition, means to render the torque combining means ineffective to combine the torques delivered by the turbines when the selectively operable means is moved to connect the driven shaft with the intermediate shaft.

18. A hydraulic variable speed power transmission comprising a casing containing a working fluid, a rotatable bladed primary impeller for directing said fluid radially outwardly, means for rotating the primary impeller in one direction, a radially extending bladed primary turbine for receiving the radially directed fluid and rotatable in the same direction as the primary impeller, a bladed rotatable secondary impeller arranged to receive the fluid exhausted from the primary turbine and to exhaust said fluid in an axial direction, means connected with the primary impeller for rotating the secondary impeller in a direction opposite to that of the primary impeller, a rotatable secondary turbine having a plurality of blades arranged to receive the fluid exhausted from the secondary impeller and to be rotated in the same direction as the secondary impeller, a fluid guide member for receiving the fluid from the secondary turbine, means including a brake for normally maintaining said guide member stationary, said brake being operable to release the guide member for free rotation, a primary output member connected with the primary turbine, a secondary torque output member connected with the secondary turbine, means for operatively connecting said output members to combine the torques delivered by the turbines, said last named means comprising a reversing gearing having a normally stationary part, a driving shaft, an intermediate shaft drivably connected with the driving shaft and with the primary impeller, a driven shaft, and selectively operable means for releasing said normally stationary part and connecting the driven shaft to the secondary output member, or for connecting the driven shaft directly to said intermediate shaft and for simultaneously operating said brake to release the guide member.

19. A fluid transmission comprising a casing, rotatable primary and secondary impeller members and rotatable primary and secondary turbine members within the casing for establishing a circulation of working fluid in a closed path for the transmission of torque, and reversing gear means positioned within the closed path of the working fluid drivably connecting the primary and secondary impeller members for rotating the latter in a direction opposite to that of the former.

20. A fluid transmission comprising a casing having rotatable primary and secondary impeller members, rotatable primary and secondary turbine members, and a normally stationary fluid guide member therein, all of said members cooperating with a working fluid for setting up a fluid working circuit in a closed path for the transmission of torque, a part carried by the guide member extending within the closed path of the working fluid, and means including gearing having a gear element supported by said part for drivably connecting the primary and secondary impeller members.

21. A fluid transmission comprising a casing having rotatable primary and secondary impeller members, rotatable primary and secondary turbine members, and a normally stationary fluid guide member therein, all of said members cooperating with a working fluid for setting up a fluid working circuit in a closed toroidal path for the transmission of torque, means connected with the guide member and forming a pair of annular ventilating chambers respectively positioned on opposite sides of one leg of the fluid working circuit and means to connect said chambers to the atmosphere exteriorly of the casing.

22. A fluid transmission comprising a casing having rotatable primary and secondary impeller members, rotatable primary and secondary turbine members, and a normally stationary fluid guide member therein, all of said members cooperating with a working fluid for setting up a fluid working circuit in a closed toroidal path for the transmission of torque, means connected with the guide member and forming a pair of annular ventilating chambers respectively positioned on opposite sides of one leg of the fluid working circuit, an annular valve movable to interrupt the flow of working fluid in said circuit, means including a chamber formed in said guide member for mounting said valve, a ventilating passage for said chamber, and means to connect the ventilating chambers and the ventilating passage to the atmosphere exteriorly of the casing.

23. A fluid transmission comprising a casing having rotatable primary and secondary impeller members, rotatable primary and secondary turbine members, and a normally stationary fluid guide member therein, all of said members cooperating with a working fluid for setting up a fluid working circuit in a closed path for the transmission of torque, said secondary impeller and turbine members being annular in form and being provided with annular ventilating chambers disposed within the casing, and means connecting said chambers to the atmosphere exteriorly of the casing.

24. A controlling mechanism for a motor vehicle of the type having a throttle controlled engine, a driving shaft, a driven shaft, and a throttle controlling element, a hydraulic power transmission for transmitting torque from the driving to the driven shaft, said transmission including a single casing having rotatable impeller and turbine members and a normally stationary fluid guiding member therein all cooperative with a working fluid to establish a working circuit having a closed path within the casing, valve means carried by said fluid guiding member and movable in the casing to variably restrict the flow of fluid in said circuit and thereby vary the torque transmission, and means controlled by movement of said throttle controlling element for moving said valve means.

25. A hydraulic variable speed power transmission comprising a casing containing a working fluid, a rotatable bladed primary impeller for directing said fluid radially outwardly, a radially extending bladed primary turbine for receiving the radially directed fluid, a bladed rotatable secondary impeller arranged to receive the fluid exhausted from the primary turbine, increase its velocity and to exhaust said fluid in an axial direction, means connected with the primary impeller for rotating the secondary impeller in a direction opposite to that of the primary impeller, a rotatable bladed secondary turbine for receiving the fluid exhausted from the secondary impeller, and for directing the fluid to flow in a path having the same direction as the direction of rotation of the primary impeller, and a fluid guide member for receiving the fluid from the secondary turbine and for returning said fluid to the primary impeller.

26. A hydraulic variable speed power transmission comprising a casing containing a working fluid, a rotatable bladed primary impeller for directing said fluid radially outwardly, means for rotating the primary impeller in one direction, a radially extending bladed primary turbine for receiving the radially directed fluid and rotatable in the same direction as the primary impeller, a bladed rotatable secondary impeller arranged to receive the fluid exhausted from the primary turbine and to exhaust said fluid in an axial direction, means connected with the primary impeller for rotating the secondary impeller in a direction opposite to that of the primary impeller, a rotatable bladed secondary turbine for receiving the fluid exhausted from the secondary impeller, and for directing the fluid in a path having the same direction as the direction of rotation of the primary impeller, and a fluid guide member for receiving the fluid from the secondary turbine and for returning said fluid to the primary impeller.

27. A hydraulic variable speed power transmission comprising a casing containing a working fluid, a rotatable bladed primary impeller for directing said fluid radially outwardly, means for rotating the primary impeller in one direction, a radially extending bladed primary turbine for receiving the radially directed fluid and rotatable in the same direction as the primary impeller, a bladed rotatable secondary impeller arranged to receive the fluid exhausted from the primary turbine and to exhaust said fluid in an axial direction, means connected with the primary impeller for rotating the secondary impeller in a direction opposite to that of the primary impeller, a rotatable bladed secondary turbine for receiving the fluid exhausted from the secondary impeller, a fluid guide member for receiving the fluid from the secondary turbine and for returning said fluid to the primary impeller, and means operable at will to restrict the circulation of fluid while the impellers and turbines continue to rotate.

28. A controlling mechanism for a motor vehicle of the type having a throttle controlled engine, a driving shaft, a driven shaft, and a throttle controlling element, a hydraulic power transmission for transmitting torque from the driving to the driven shaft, said transmission including a single casing having rotatable impeller and turbine members and a normally stationary fluid guiding member therein all cooperative with a working fluid to establish a working circuit having a closed path within the casing, valve means carried by said fluid guiding member and movable in the casing to variably restrict the flow of fluid in said circuit and thereby vary the torque transmission, and means controlled by movement of said throttle controlling element when moved in a throttle closing direction to move said valve means to stop the flow of fluid in said circuit, thereby stopping the transmission of torque from the driving to the driven shaft and thus neutralizing the transmission.

29. A controlling mechanism for a motor vehicle of the type having a throttle controlled engine, a driving shaft, a driven shaft, and a throttle controlling element, a hydraulic power transmission for transmitting torque from the driving to the driven shaft, said transmission including a single casing having rotatable impeller and turbine members and a normally stationary fluid guiding member therein all cooperative with a working fluid to establish a working circuit having a closed path within the casing, valve means carried by said fluid guiding member and movable in the casing to variably restrict the flow of fluid in said circuit and thereby vary the torque transmission, and means controlled by movement of said throttle controlling element beyond the full open throttle position to move said valve means to partially restrict the flow of fluid in said working circuit.

30. A controlling mechanism for a motor vehicle of the type having a throttle controlled engine, a driving shaft, and a driven shaft, a throttle controlling element movable in a throttle operating range and movable in a controlling range, a hydraulic power transmission for transmitting torque from the driving to the driven shaft, said transmission including a single casing having rotatable impeller and turbine members and a normally stationary fluid guiding member therein all cooperative with a working fluid to establish a working circuit having a closed path within the casing, normally open valve means carried by said fluid guiding member and movable in the casing to variably restrict the flow of fluid in said circuit and thereby vary the torque transmission, means controlled by movement of said throttle controlling element upon movement thereof in said controlling range for moving said valve means to restrict said flow, and power means operable to move said valve means to open position upon movement of the throttle controlling element from said controlling range to said throttle operating range.

31. A controlling mechanism for a motor vehicle of the type having an engine, a driving shaft, a driven shaft, and a brake mechanism, a hydraulic power transmission for transmitting torque from the driving to the driven shaft, said transmission including rotatable impeller and turbine members and a normally stationary fluid guiding member all cooperative with a working fluid to establish a working circuit having a closed path, valve means carried by said fluid guiding member and movable to stop the flow of fluid in said circuit and thereby arrest the torque transmission, a brake operating member, means for mounting said brake operating member for movement in a first range and for movement in a second range, means controlled by movement of said brake operating member upon movement thereof in said first range to move said valve means to stop the flow of fluid in said circuit, and means controlled by movement of said brake operating member upon movement thereof in said second range for applying said brake mechanism to stop the vehicle and arrest movement of said driven shaft.

32. A hydraulic variable speed power transmission comprising a casing containing a working fluid, a rotatable bladed primary impeller for directing said fluid radially outwardly, a radially extending bladed primary turbine for receiving the radially directed fluid, a bladed rotatable secondary impeller arranged to receive the fluid exhausted from the primary turbine, increase its velocity and exhaust said fluid in an axial direction, means connected with the primary impeller for rotating the secondary impeller in a direction opposite to that of the primary impeller, a rotatable bladed secondary turbine for receiving the fluid exhausted from the secondary impeller, directing the fluid axially therethrough, and exhausting said fluid to flow in the same direction as the direction of rotation of the primary impeller, and a fluid guide member for receiving the fluid from the secondary turbine and for returning said fluid to the primary impeller.

33. A hydraulic variable speed power transmission comprising a casing containing a working fluid, a rotatable bladed primary impeller for directing said fluid radially outwardly, a radially extending bladed primary turbine for receiving the radially directed fluid, a bladed rotatable secondary impeller arranged to receive the fluid exhausted from the primary turbine, increase its velocity and exhaust said fluid in an axial direction, means connected with the primary impeller for rotating the secondary impeller in a direction opposite to that of the primary impeller, a rotatable bladed secondary turbine for receiving the fluid exhausted from the secondary impeller, said secondary impeller and said secondary turbine being positioned at a greater distance from the axis of rotation of all said impellers and turbines than the primary impeller and the primary turbine, and a fluid guide member for receiving the fluid from the secondary turbine and for returning said fluid to the primary impeller to complete a fluid working circuit.

34. A power transmission mechanism as set forth in claim 33 which includes in addition, an output member, and means interconecting said turbine members to deliver the combined torques of said turbine members to said output member.

35. A power transmission mechanism as set forth in claim 33 which includes in addition, a driving shaft connected with the impellers, a driven shaft connected with the turbines and means operable at will for directly connecting the driving and driven shafts.

36. A power transmission mechanism as set forth in claim 33 which includes in addition, means operable at will to variably restrict the circulation of fluid in said working circuit while the impeller members are rotating.

37. A power transmission mechanism as set forth in claim 33 which includes in addition, means for cooling the fluid including a cooling chamber positioned interiorly of said working circuit.

EDWARD J. THURBER.

REFERENCES CITED

The following references are of record in the file of this patent:

UNITED STATES PATENTS

| Number | Name | Date |
|---|---|---|
| 1,319,752 | Brown | Oct. 28, 1919 |
| 1,327,080 | Brown | Jan. 6, 1920 |
| 1,551,055 | Rieseler | Aug. 25, 1925 |
| 1,855,967 | Jandasek | Apr. 26, 1932 |
| 2,014,944 | Martyrer | Sept. 17, 1935 |
| 2,042,189 | Robe | May 26, 1936 |
| 2,067,793 | Siebold | Jan. 12, 1937 |
| 2,102,755 | Sinclair | Dec. 21, 1937 |
| 2,104,608 | Cox | Jan. 4, 1938 |
| 2,205,794 | Jandasek | June 25, 1940 |
| 2,235,672 | Dodge | Mar. 18, 1941 |
| 2,270,536 | Lenning | Jan. 20, 1942 |
| 2,280,015 | Tipton | Apr. 14, 1942 |
| 2,340,494 | Smirl | Feb. 1, 1944 |
| 2,341,921 | Jandasek | Feb. 15, 1944 |
| 2,377,825 | Teagno | June 5, 1945 |
| 2,379,015 | Lysholm | June 26, 1945 |
| 2,388,329 | Jandasek | Nov. 6, 1945 |
| 2,457,692 | La Brie | Dec. 28, 1948 |
| 2,492,456 | Becker | Dec. 27, 1949 |
| 2,516,385 | Hodge | July 25, 1950 |